March 5, 1963     O. ERLANDSEN     3,080,176
EQUALIZED TANDEM AXLE FOR VEHICLES
Filed Aug. 28, 1957     4 Sheets-Sheet 1
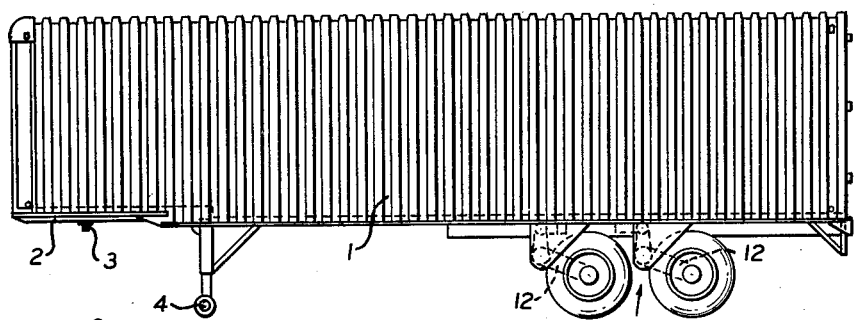
FIG. 1.
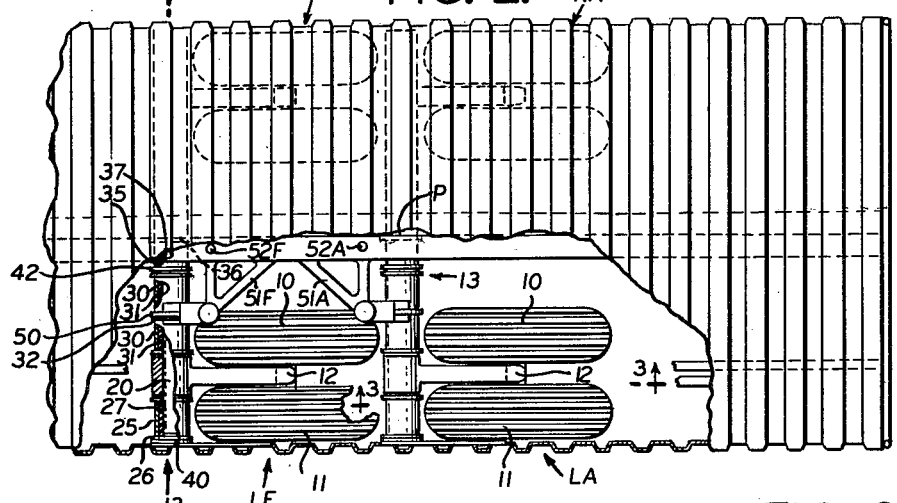
FIG. 2.
FIG. 4.     FIG. 3.
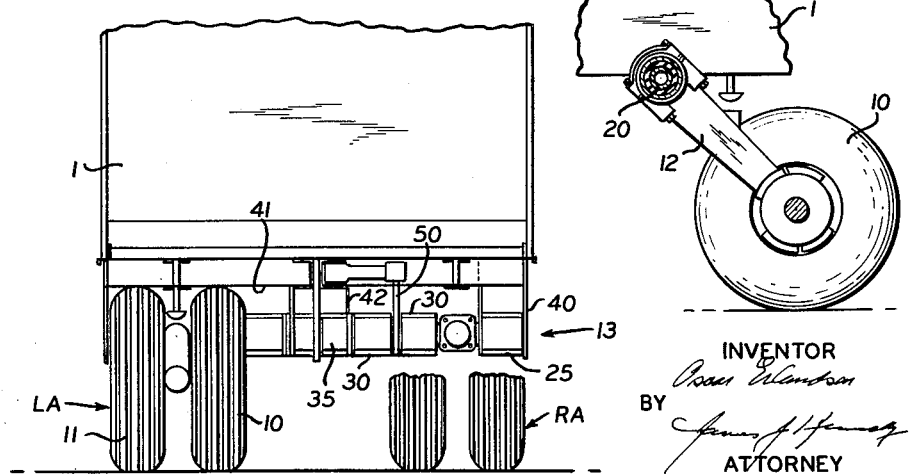
INVENTOR
Oscar Erlandsen
BY
ATTORNEY March 5, 1963  O. ERLANDSEN  3,080,176
EQUALIZED TANDEM AXLE FOR VEHICLES
Filed Aug. 28, 1957  4 Sheets-Sheet 2
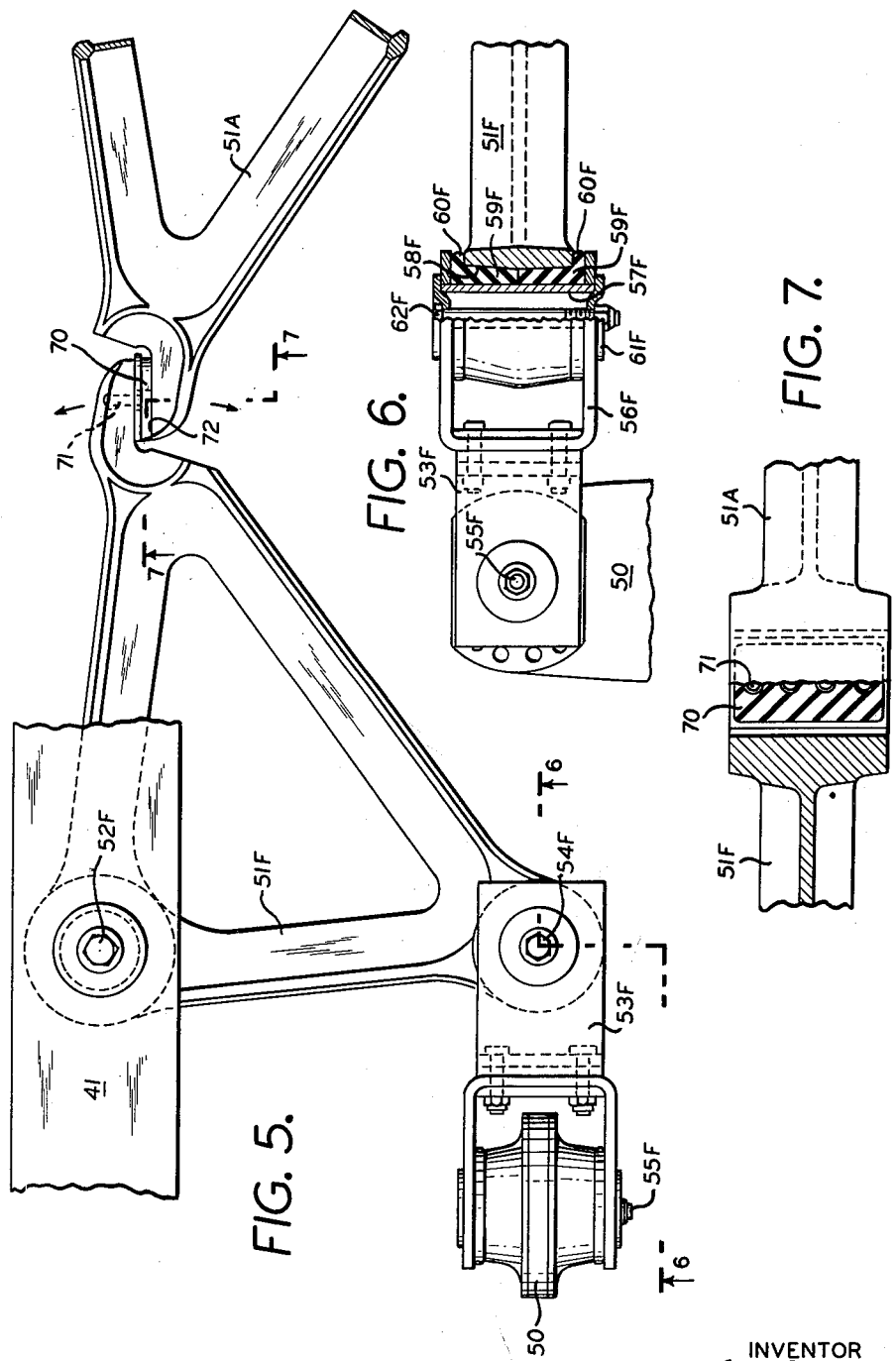
INVENTOR
Oscar Erlandsen
BY
ATTORNEY March 5, 1963 O. ERLANDSEN 3,080,176
EQUALIZED TANDEM AXLE FOR VEHICLES
Filed Aug. 28, 1957 4 Sheets-Sheet 3
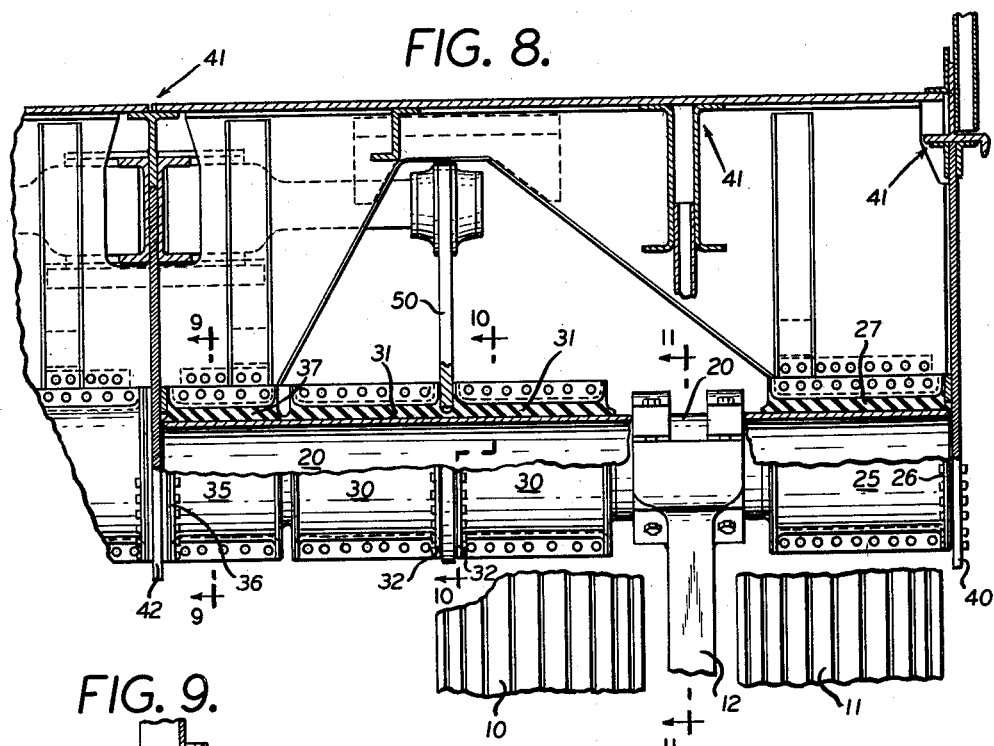
FIG. 8.
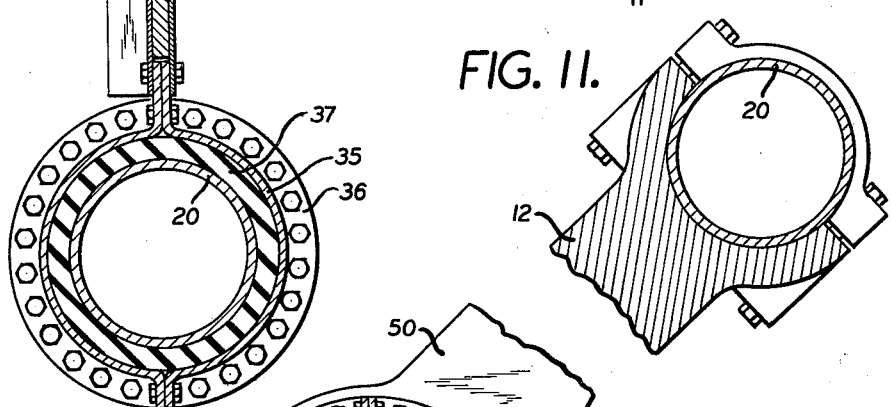
FIG. 9.
FIG. 11.
FIG. 10.
INVENTOR
Oscar Erlandsen
BY
ATTORNEY 3,080,176
Patented Mar. 5, 1963

3,080,176
EQUALIZED TANDEM AXLE FOR VEHICLES
Oscar Erlandsen, Garden City, N.Y., assignor to Grumman Aircraft Engineering Corporation, Bethpage, N.Y., a corporation of New York
Filed Aug. 28, 1957, Ser. No. 680,828
4 Claims. (Cl. 280—104.5)

This invention relates to automotive trailers.

More particularly, the invention is concerned with wheel suspensions for automotive trailers.

The general object of the invention is to provide an improved trailer wheel suspension of the type in which the wheels are carried on pivotally mounted arms and sprung by means of elastic sleeve elements of the type commonly known as "Torsilastic" springs. A suspension of this type is disclosed in prior Grumman Patent No. 2,773,699, issued December 11, 1956, for Trailer Rear Wheel Torsion Spring Suspension and the present invention is concerned with improvements on the suspension there disclosed, involving improvements in the wheel suspensions themselves, and provision of multiple suspensions of a tandem type.

It is an object of the invention to provide an improved equalizer spring arrangement for tandem wheel arrangements.

A second object of the invention is to provide an improved mounting for torsion springs for vehicles in which the wheel carrying element is affixed to a central or inner shaft and outer tubular shaft elements are secured to the vehicle.

A further object of the invention is to provide a wheel suspension adapted to use with aluminum vehicle bodies and eliminating corrosion problems due to the use of ferrous metal elements in the wheel suspensions.

A trailer embodying the invention in a preferred form will now be fully described with reference to the accompanying drawing, and the features forming the invention will then be pointed out in the appended claims.

In the drawing:

FIG. 1 is a side elevation of a trailer embodying the invention in a preferred form;

FIG. 2 is an enlarged partial plan view of the trailer of FIG. 1 and partly broken away to show details of construction;

FIG. 3 is a section on the line 3—3 of FIG. 2;

FIG. 4 is a rear elevation with parts broken away to show details of construction;

FIG. 5 is an enlarged plan view of an equalizer linkage connecting the fore and aft elements of the tandem wheel suspension;

FIG. 6 is a section on the line 6—6 of FIG. 5;

FIG. 7 is a section on the line 7—7 of FIG. 5;

FIG. 8 is an enlarged section on the line 8—8 of FIG. 2;

Figure 12:
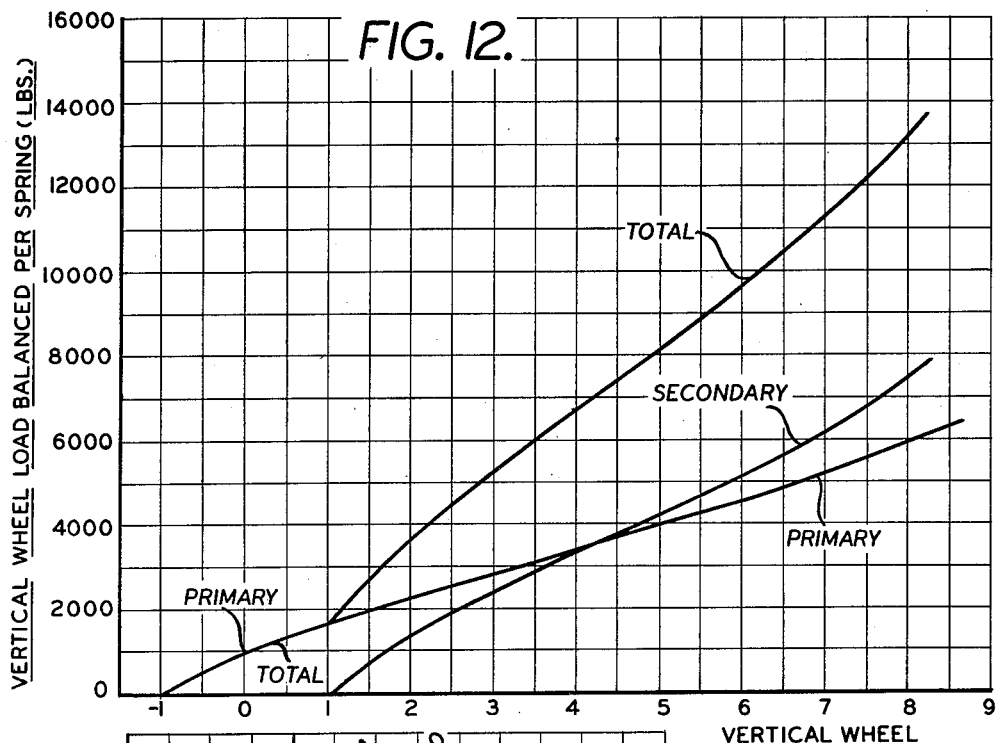
Figure 13:
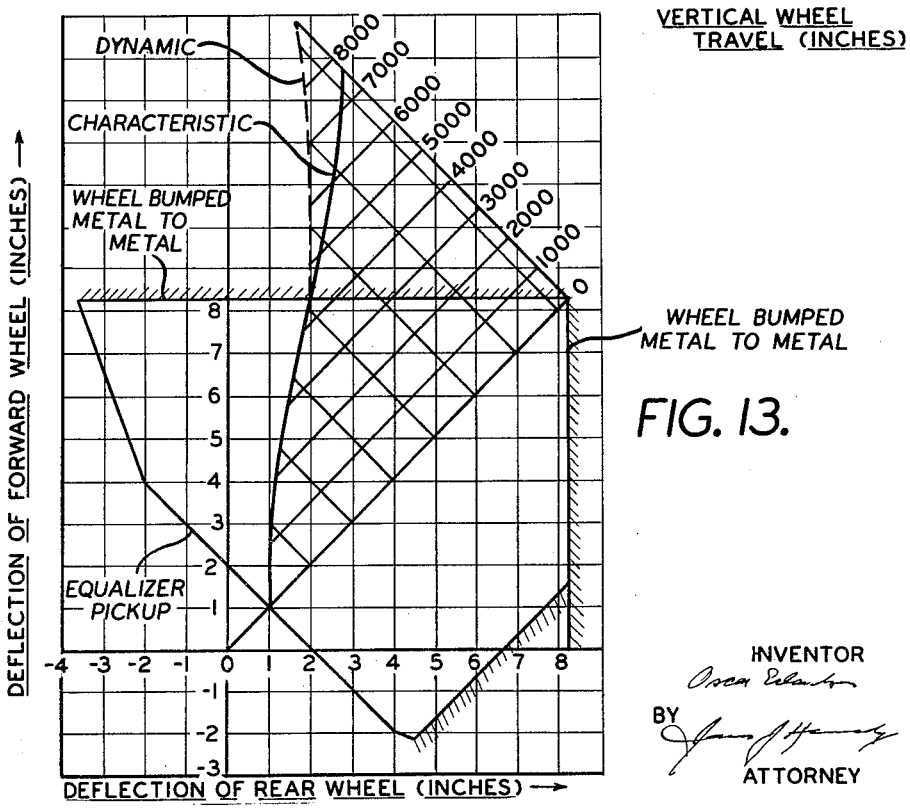

FIGS. 9, 10 and 11 are detail enlarged sections on the respective lines 9—9, 10—10 and 11—11 of FIG. 8;

FIG. 12 is a deflection load curve for the spring elements of the suspension; and FIG. 13 is a chart showing the deflection load characteristics of the equalizer spring arrangement of the invention.

The trailer, which may be of generally familiar type, comprises a body 1 supported in use at the forward end by a tractor element and having a supporting surface 2 and coupling 3 for this purpose. When not attached to the tractor, the forward end of the trailer is supported by a wheel 4 in the usual way. The aft end is supported by a wheel suspension assembly indicated generally at 5, which in the wheel suspension illustrated includes eight wheels arranged in four sets of two wheels each and interconnected as later described. The fore and aft suspensions may be substantially identical and the right and left suspensions are also substantially identical except for being mirror images or, respectively, right and left hand. As to the details of the suspension for each pair of wheels, it is, accordingly, sufficient to describe one of these suspensions, and the present description will be directed principally to the left forward suspension, which is identified by the reference character LF.

An inboard wheel 10 and outboard wheel 11 are carried at the end of a pivoted arm 12, the upper end of which is supported by a cross shaft structure indicated generally at 13. The support shaft structure 13, which is best shown in FIGS. 2, 3 and 8 to 10, comprises on each side of the center line of the trailer an inner shaft element 20, to which the pivot arm 12 is fixed, and outer hollow shaft elements or sleeves 25, 30 and 35. The outboard element 25 is secured by means of its flange 26 to a depending bracket element 40, which, in turn, is fastened to the understructure 41 of the trailer, and the inboard hollow shaft element 35 is similarly attached by means of its flange 36 to a central bracket element 42 which is also fixed to the frame structure 41. Elements 25 and 20 and elements 35 and 20 form a resilient torsion spring suspension, rubber 27 and 37 being interposed between the elements and bonded thereto. The elements 30 and shaft 20 form resilient torsion springs coupling the rear suspension LA to the forward suspension LF, as later described, and rubber 31 is bonded to elements 30 and 20 for this purpose.

The equalizer or coupling between the fore and aft suspensions comprises an arm 50 secured to the outer sleeve elements 30 by means of the flanges 32 thereon and connected to an equalizer linkage as shown in FIGS. 5-7. The equalizer linkage includes a forward triangular frame 51F and an aft frame 51A, these frames being pivotally connected to the frame structure 41 of the trailer at 52F and 52A, respectively, for pivoting about vertical axes. A link 53F is pivotally connected at 54F to the frame 51F for pivoting about a vertical axis and is pivotally connected at 55F to the upper end of the arm 50, previously referred to. The connection 54F is shown in FIG. 6, and comprises a fork 56F forming one end of the link 53F, to which is secured a central shaft element 57F. The pivoted triangular frame 51F is formed with a bore 58F which receives a pair of rubber sleeve elements 59F, having end flanges 60F, as shown. The rubber elements 59F connect link 53F and frame 51F, allowing the limited amount of pivotal movement necessary and transmitting the required forces as described below with a minimum of shock and wear.

The link 53F is held in position vertically by means of the flanges 60F of the rubber elements. The assembly is held together by a pair of end washer elements 61F and a bolt 62F which hold the central tubular shaft element 57F, previously referred to, in position in the fork 56F. The structure of the pivot 52F is generally similar and requires no further description. The pivotal coupling 55F apart from minor differences in shape of the elements is also similar to the coupling 54F just described. It will be apparent that the linkage which has been described provides shock absorption at all required points with a limited but sufficient pivotal movement in the joints and without requiring lubricated bearings at any point. The fore and aft pivoted arms 51F and 51A engage each other as shown in FIGS. 5 and 7 by means of a rubber pad 70 fixed to the end of the frame 51F by means of bolts 71 and engaging a flat surface 72 on the aft pivoted frame 51A.

Assuming now static conditions under which the load is supported equally by all eight wheels, the force exerted on each arm 12 at the cross shaft 13 will be resolved into a couple and a vertical force transmitted through the rubber 27 and 37 in the torsion springs supporting the inner shaft 20 at its ends and into a couple exerted through the equalizer torsion spring structures 30. Under zero load conditions, the pad 70 and surface 72 of the equalizer linkage may be somewhat separated, bringing the equalizer torsion springs 30 into action somewhat later than the torsion springs 25 and 35, as later described in more detail.

Under evenly distributed load conditions, the fore and aft elements of a wheel suspension will be equally deflected, the torque on shaft 20 being balanced partly by the resilient torsion springs 25, 35 and partly by the equalizer resilient torsion springs 30. The distribution of torque between these elements may be varied to suit particular conditions both as to the deflection conditions under which equalization occurs and as to the percentage of the total torque distributed between the primary springs 25, 35 and equalizer springs 30, 30. Since the vertical support of a vehicle is through the rubber or resilient elements 27, 37 of the primary springs, these springs will be made sufficiently large as to carry this load satisfactorily, and provided this requirement is fulfilled, the distribution of torque between the primary and secondary spring systems may be selected at will. In the construction shown by way of example, the load distribution as between the primary and secondary springs is about equal, for medium deflections.

If, now, a static inequality be assumed to exist, involving, for example, the raising of the rear pair of wheels as compared with the front pair, it will be observed that more load will be carried through the torque exerted against the end sleeve elements 25 and 35 of the rear wheel suspension than in the case of the front wheel suspension. However, the greater angular movement of the rear shaft 20 is also exerted through the equalizer coupling 30 and is transmitted through arms 50 and the equalizer linkage of FIG. 5, to the forward suspension, and in a direction to exert downward pressure on the forward pair of wheels. This latter load remains balanced as between the front pair of wheels and rear pair of wheels, even though the wheel deflections are different.

Referring to FIGS. 2 and 5 of the drawing, it will be noted that an upward movement of the forward wheels 11 tends to produce a clockwise rotation of the bell crank frame 51F, while an upward movement of the rear wheels 11 also tends to produce a clockwise movement of the aft bell crank frame 51A, which two movements oppose each other. Once the initial loosening of the equalizer system has been taken up so that pad 70 is pressing against the surface 72, it will be apparent that the loading of the trailer will stress the fore and aft torsion springs more or less proportionately to the stressing of the inboard and outboard springs, but leaving the parts in substantially the position of FIG. 5. Under the static load conditions referred to above, if now the front wheels are raised on a high point in the road, as compared with the back wheels, the frame 51F will be swung clockwise tending to cause the frame 51A to swing counter-clockwise, and applying a downward couple against the arm 12 which supports the rear wheels, so as to distribute the load. Assuming a linear characteristic for all the torsion springs involved, it will be apparent that the raising of the forward wheels by a given angle of movement of the arm 12 will increase the downward torque exerted through the rubber 27 and 37 at the ends of the shaft 20 by an amount proportionate to the angle. This tends to increase the load carried by the front elements of the assembly. At the same time, however, the sleeve 30 will be caused to turn, rotating frame 51F clockwise and frame 51A counter-clockwise, so as to rotate the sleeve 30 associated with the aft wheels in a direction to exert downward pressure on these wheels.

The amount of equalization thus provided may be controlled within a wide range, as mentioned above, by varying the dimensions of the torsion spring elements, so as to provide suitable stiffnesses or rates.

FIGS. 12 and 13 illustrate the suspension spring characteristics of a typical design. In FIG. 12, the curve marked "primary" gives the load-deflection characteristic for the spring elements 25, 35 associated with a given shaft assembly 13, the curve marked "secondary" gives the load-deflection characteristic for the elements 30 associated with the same shaft assembly and the curve marked "total" gives the combined load-deflection curve. FIG. 13 is a diagram giving the equalizer system load for various deflections of the front and rear elements of a suspension, and is read in the following manner: the deflections of the front and rear elements are read off on the horizontal and vertical scales, determining a point from which a line at 45° extending upwardly to the left is drawn to the curve marked "characteristic," from this point of intersection a line at 45° and extending upwardly to the right is drawn to the diagonal scale marked from zero to 8,000, and the vertical wheel load balanced by the equalizer system is read off on this scale. For example, assuming four inches deflection of both elements, a reading of about 3300 lbs. is obtained, which reading agrees with the value given by the "secondary" curve of FIG. 12. Since the loading of the primary and secondary springs at four inches deflection is the same, this represents a condition where 3300 lbs. of load is balanced by the primary spring 25, 35 and 3300 lbs. is balanced by the secondary spring 30, 30. A similar distribution of load between the primary and secondary or equalizer spring system will exist if the deflections of the front and rear wheels are respectively decreased and increased. For example, if the deflections are respectively three and five inches, the equalizer load will remain at the same value, 3300 lbs., as is apparent from FIG. 13. The primary spring load may be read off the "primary" curve in FIG. 12 and equals about 2800 lbs. on the forward wheel and about 4200 lbs. on the rear wheel. The total loads per wheel pair are thus about 6100 and 7500 lbs., respectively.

Under dynamic conditions, it will be observed that the system contains no hydraulic shock absorbers or other major damping factors, that the wheels are free to move vertically except as restrained by the torsion spring mountings. The instantaneous action necessary for accommodation to inequalities in the road surface while moving at high speed is thus provided.

The suspension is preferably located, so that the turning center P (FIG. 2) of the trailer when loaded will be located at a point ahead of the rear wheels and behind the front wheels. Under these conditions, the lateral forces involved against the wheels resolve themselves into a bending moment on the rear wheel carrying arms 12 which tends to twist these arms about vertical axes at their points of support by shaft 20 and in a direction such as to move the wheels toward the inside of the curve. The opposite effect exists with relation to the front wheel assemblies, and in this case the tendency is to swing the wheels toward the outside of the curve. Lateral bending of the arms 12 within reasonable limits is not objectionable, as it tends to reduce the skidding component while taking a curve and to that extent to reduce tire wear. In consequence, the arms 12, for a given amount of metal, may be shaped with maximum stiffness in the vertical or load carrying direction.

What is claimed is:

1. A trailer wheel suspension comprising four wheel pairs, two pairs being positioned on each side of the vehicle with the four wheels of each such two pairs being arranged in tandem and side by side, the mounting for each said pair comprising an arm, means rotatively supporting the wheels of the pair at each side of the lower end of the arm, means pivotally mounting the upper end of the arm on the trailer and comprising torsion spring means carrying a major part of the load, the arms for supporting each such pair at each side of the vehicle being substantially parallel and in fore and aft relation to each other, and equalizer means interconnecting the fore and aft arms at each side of the vehicle, the said equalizer means carrying the remainder of the load, the arms at each side of the vehicle being movable independently of each other, the equalizer means comprising a substantially vertical arm for each wheel mounting arm, a torsion spring coupling the vertical arm to its said wheel mounting arm and a linkage coupling the vertical arms together, the linkage comprising a pair of cooperating bell cranks pivoted for movement in a horizontal plane.

2. A trailer wheel suspension according to claim 1, in which the torsion spring coupling and linkage joints comprise resilient joint elements providing the required movements without sliding movement between the contacting surfaces.

3. A trailer wheel suspension comprising a transverse horizontal shaft element, a wheel supporting arm fixed to the said shaft element and extending downwardly and rearwardly, and a torsion spring support for the said shaft element at each side of the arm, each such support comprising a split sleeve coaxial with and surrounding the shaft and resilient material between and bonded to the sleeve and shaft element, the split sleeve comprising two halves divided on an axial plane and having co-operating flanges joining them together, the said sleeves having outer end flanges disposed in radial planes, and means fixing the said end flanges to the trailer.

4. A trailer wheel suspension comprising a transverse horizontal shaft element, a wheel supporting arm fixed to the said shaft element and extending downwardly and rearwardly, a torsion spring support for the said shaft element at each side of the arm, and an equalizer torsion spring for the said shaft element on one side of the said arm, each such equalizer spring and support spring comprising a split sleeve coaxial with and surrounding the shaft and resilient material between and bonded to the sleeve and shaft element, comprising also an equalizer arm, means pivotally mounting the said equalizer arm to the vehicle and in which the said sleeves have radial flanges and comprising means for fixing the said radial flanges of the support sleeves to the trailer and a said radial flange of the equalizer spring to an equalizer arm.

References Cited in the file of this patent

UNITED STATES PATENTS

| | | |
|---|---|---|
| 2,246,847 | Herreshoff | June 24, 1941 |
| 2,316,374 | Townsend | Apr. 13, 1943 |
| 2,333,107 | Knox | Nov. 2, 1943 |
| 2,410,747 | Reid | Nov. 5, 1946 |
| 2,563,090 | Woolson | Aug. 7, 1951 |
| 2,577,761 | Hickman | Dec. 11, 1951 |
| 2,635,896 | Tantlinger | Apr. 21, 1953 |
| 2,690,335 | Ballard | Sept. 28, 1954 |
| 2,698,758 | Ronning | Jan. 4, 1955 |
| 2,704,021 | Brundage | Mar. 15, 1955 |
| 2,743,939 | Reid | May 1, 1956 |
| 2,773,699 | Grumman | Dec. 11, 1956 |
| 2,852,269 | Gaines | Sept. 16, 1958 |
| 2,951,710 | Willetts | Sept. 6, 1960 |
| 2,957,706 | Hanley | Oct. 25, 1960 |

OTHER REFERENCES

Article: Page 184, "Commercial Car Journal," March 1958.

Article: Page 24, "Automotive and Aeration Industries," Apr. 15, 1946.